United States Patent [19]
Uehara et al.

[11] Patent Number: 5,643,990
[45] Date of Patent: Jul. 1, 1997

[54] RESIN COMPOUND

[75] Inventors: Shotaro Uehara, Tojyo; Munehiro Mitsui, Tokyo; Seiichi Atomori, Tokyo; Tateki Furuyama, Tokyo; Atushi Shiota, Tokyo; Mineo Fujimura, Tokyo; Masaki Nagata, Tokyo, all of Japan

[73] Assignee: Hyperion Catalysts International, Inc., Cambridge, Mass.

[21] Appl. No.: 331,330

[22] Filed: Oct. 28, 1994

Related U.S. Application Data

[63] Continuation of Ser. No. 23,471, Feb. 25, 1993, abandoned, which is a continuation of Ser. No. 654,507, Feb. 23, 1991, abandoned, which is a continuation of Ser. No. 567,017, Aug. 14, 1990, abandoned.

[30] Foreign Application Priority Data

Aug. 14, 1989 [JP] Japan ..................... 1-209890

[51] Int. Cl.$^6$ ..................... C08K 3/04
[52] U.S. Cl. ..................... 524/496; 523/220; 524/424; 524/495; 252/511
[58] Field of Search ..................... 523/220; 524/424, 524/495, 496; 252/511

[56] References Cited

U.S. PATENT DOCUMENTS

| 4,569,786 | 2/1986 | Deguchi | 252/503 |
| 4,663,230 | 5/1987 | Tennent | 428/367 |

FOREIGN PATENT DOCUMENTS

| 61-089249 | 5/1986 | Japan | 524/496 |
| 62-215635 | 9/1987 | Japan | 524/496 |

OTHER PUBLICATIONS

*The Condensed Chemical Dictionary*, 169, 426 (8th Ed. 1971).

*Primary Examiner*—Paul R. Michl
*Assistant Examiner*—John J. Guarriello
*Attorney, Agent, or Firm*—Curtis, Morris & Safford, P.C.

[57] ABSTRACT

A resin compound having superior electrical, mechanical, and molding properties that includes a synthetic resin and carbon fibrils. At least 50 wt % of the fibrils are intertwined to form fibril agglomerates whose diameter is in the range of 0.10–0.25 mm.

26 Claims, No Drawings

RESIN COMPOUND

This application is a continuation of application Ser. No. 08/023,471, filed Feb. 25, 1993, now abandoned which is a continuation of Ser. No. 07/654,507, filed on Feb. 23, 1991, which is a continuation of Ser. No. 07/567,017, now abandoned filed on Aug. 14, 1990.

BACKGROUND OF THE INVENTION

The present invention concerns a new resin compound, and more specifically, it concerns a resin compound which has superior electrical conductivity, blackness, lubricating characteristics, etc., and which is made of a synthetic resin and ultra-fine carbon fibrils with special structures.

Information processing and office automation equipment is quickly becoming popular in recent years due to the rapid development in electronics technology. As such electronics equipment becomes more popular, electro-magnetic problems caused by the noises generated by the electronic parts on their peripherals, or operating troubles caused by static electricity have become a serious issue. Materials with superior electrical conductivity or electrical insulating characteristics are in great demand in these areas for the purpose of solving these problems.

Conventionally, electro-conductive polymers have been widely used which are produced by imparting electrical conductivity to polymer materials with poor electrical conductivity through the addition of an electro-conductive filler. Metal fibers, metal powder, carbon black, carbon fibers, etc. are generally used as an electro-conductive filler. However, metal fibers and metal powder, when used as an electro-conductive filler, have shortcomings such as poor corrosion resistance or difficulty in obtaining sufficient mechanical strength despite their excellent electrical conductivity.

When using carbon black as an electro-conductive filler, special electro-conductive carbon black such as Kechen Black, Vulcan XC72, or acetylene black are normally used instead of normal carbon black. However, such special carbon black does not easily disperse in resin material. Since dispersion of carbon black significantly affects the electrical conductivity of the product resin compound, special compounding and mixing techniques are required in order to obtain stable electrical conductivity.

On the other hand, when carbon fiber is used as an electro-conductive filler, desired strength and elasticity can be obtained by using the normal carbon fiber. However, a high filler content is required in order to impart electrical conductivity, resulting in the deterioration of the original characteristics specific to the resin itself. Further, if a molded product with a complicated shape is intended, uneven filler distribution tends to occur, which in turn results in uneven electrical conductivity. In the case of carbon fiber, a greater electrical conductivity imparting effect is expected when the fiber diameter is smaller, resulting in a greater contact area between the resin body and the fiber.

As an example of such fine carbon fibers, ultra-fine carbon fibrils with superior electrical conductivity have been described in Early Disclosure Patent Gazette Sho 62-500943. However, this carbon fibril is still unsatisfactory because when it is mixed with a resin, it is poorly distributed in the resin, substantially damaging the appearance of the molded product.

Furthermore, when carbon black is used merely for the purpose of coloring a resin, a relatively large amount of carbon black is required in order to obtain a desired blackness when conventionally known carbon black is used as a pigment (black pigment), which in turn causes problems with dispersion and appearance of the molded product.

The present invention intends to achieve a steadily high electrical conductivity and/or superior blackness without losing the molding ability and surface appearance of the resin compound by uniformly dispersing ultra-fine carbon fibrils in the process of imparting electrical conductivity and/or blackness to a resin.

SUMMARY OF THE INVENTION

The present invention offers a resin compound which consists of 99.9–50 wt parts of synthetic resin and 0.1–50 wt parts of carbon fibril, of which more than 50 wt % is a fiber agglomerate whose diameter is in the range of 0.10–0.25 mm with a maximum diameter less than 0.25 mm, and said fiber agglomerate is formed by intertwined carbon fibrils, whose diameter is within the range of 3.5–70 nm, and length is greater than at least 5 times the diameter, and which consists of an outer zone formed by substantially continuous layers of ordered carbon atoms and an inner core, both of which are coaxially aligned along the cylindrical axis of the fibril.

The resin compound covered by the present invention uses ultra-fine carbon fibrils whose diameter is 3.5–70 nm and length greater than at least 5 times the diameter, or preferably, whose diameter is 3.5–40 nm and length is $10^2$–$10^4$ times the diameter.

When the diameter exceeds 70 nm, the fibril does not effectively impart electrical conductivity, whereas when the diameter is less than 3.5 nm the fibril tends to fly around, causing handling problems. When the length of the fibril is less than 5 times the diameter, the fibril does not effectively impart electrical conductivity.

The ultra-fine carbon fibril used in the present invention is an essentially cylindrical fibril which contains an outer zone made of substantially continuous layers of ordered carbon atoms and an inner core, and the outer zone and the inner core are coaxially aligned along the cylindrical axis of the fibril. Further, the ordered carbon atoms in the aforementioned outer zone are in graphitic form, and the aforementioned inner core is hollow or contains carbon atoms which are less ordered than the carbon atoms in the outer zone, and the diameter of the inner core is greater than 2 nm.

In view of the electrical conductivity, the desirable interlayer distance between the continuous layers of the ordered carbon atoms measured by the wide angle X-Ray diffraction method is within 3.38–3.50 A, and the desirable diffraction angle is within 25.5.–26.3 degrees. In addition, the ultra-fine carbon fibril used in the present invention may be surface-treated with ozone, nitric acid, monomer, etc. before being used.

The specific ultra-fine carbon fibril used in the present invention is described in detail in the specifications of Patent Gazette Sho 62-0500943 and U.S. Pat. No. 4,663,230, and therefore contents of the specification in the Patent Gazette and USP are incorporated in the specification of the present invention by reference.

Such ultra-fine carbon fibrils can be desirably produced, as it is described in the specifications of the above mentioned Patent Gazette and USP for example, by contacting a suitable metal containing particle (for example, an iron, cobalt, or nickel-containing particle on an alumina carrier) with a suitable carbon-containing gaseous organic compound at 850°–1200° C. under a suitable pressure (for example, 0.1–10 atm.) for a suitable period of time (for example, 10 sec to 180 min), choosing the dry weight ratio between the carbon-containing organic compound and the metal-containing particle to be at least 100:1.

The metal-containing particle may be contacted with the carbon-containing organic compound in the presence of a compound such as $CO_2$, $H_2$, or $H_2O$ which is capable of producing gaseous products by reacting with carbon.

As an example of the suitable carbon-containing organic compound, aromatic hydrocarbons such as benzene, toluene, xylene, cumene, ethylbenzene, naphthalene, phenanthrene, anthracene, or mixtures of these compounds, non-aromatic hydrocarbons such as methane, ethane, propane, ethylene, propylene, or acetylene or mixtures of these compounds, hydrocarbons including oxygen-containing hydrocarbons such as formaldehyde, acetoaldehyde, acetone, methanol, ethanol, or mixtures of these compounds, or carbon monoxide can be mentioned.

The desirable metal-containing particle may be iron, cobalt, or nickel-containing particles with about 3.5–70 nm diameter.

Such particles are deposited on a chemically compatible heat-resistant carrier such as alumina, carbon, or aluminum-silicate as a support. For example, the surface of the metal containing particle can be independently heated to about 850°–1800° C. by electro-magnetic radiation so that the temperature of the particle becomes higher than the temperature of the carbon containing gaseous organic compound.

In a specific example, a metal-containing particle is contacted with a carbon-containing organic compound under about 1/10 atm to 10 atm for a period of 10 sec to 180 min. In this example, the metal-containing particle is an iron-containing particle, and the carbon-containing gaseous organic compound is benzene. The reaction temperature is 900° C.–1150° C., the ratio between the carbon-containing organic compound and the metal-containing particles is greater than about 1000:1. In addition, the iron-containing particle is deposited on a chemically compatible heat resistant support such as alumina or carbon.

The ultra-fine carbon fibril used in the present invention is in the form of an intertwined fiber agglomerate whose diameter is within a specific range.

Dimensions of the agglomerate made of the ultra-fine carbon fibrils obtained by the above-described method are irregular, and a significant amount of agglomerate whose diameter is greater than 0.25 mm is also contained. Ultra-fine carbon fibrils, which contain more than 50 wt % of the agglomerate whose diameter is in the range of 0.10 to 0.25 mm with a maximum diameter less than 0.25 mm, may be obtained by treating untreated ultra-fine carbon fibrils in a 800 $cm^3$ stainless steel vessel which contains 500 g of steel balls with 12.8 mm diameter at 1720 rpm for a period of 35 minutes using a vibratory ball mill, for example. However, this treatment is merely an example, and the method is not restricted to this example.

When the ultra-fine carbon fibrils contain a large amount of agglomerates with a diameter greater than 0.25 mm, they do not disperse well in the resin in the process of producing a resin compound, nor do they provide sufficient electrical conductivity, resulting in lower mechanical strength and poor molding ability as well as drastic deterioration in the surface appearance of the molded product. When the content of the agglomerate, whose diameter is within 0.1–0.25 mm, is less than 50%, the ultra-fine carbon fibril does not provide sufficient electric conductivity, resulting in poor mechanical strength in the obtained resin compound.

As the synthetic resin used in the present invention, either thermo-plastic or thermo-setting resins can be used. As an example of thermo-plastic resins, acrylonitrile-butadiene-styrene resin (ABS resin), acrylonitrile-ethylene/propylene-styrene resin (AES resin), methylmethacrylate-butadiene-styrene resin (MBS resin), acrylonitril-butadiene-methylmethacrylate-styrene resin (ABMS resin), acrylonitrile-n-butylacrylate-styrene resin (AAS resin), rubber modified polystyrene (high impact polystyrene), polyethylene resin, polypropylene resin, polystyrene resin, polymethyl-methacrylate resin, polyvinylchloride resin, cellulose-acetate resin, polyamide resin, polyester resin, polyacrylonitrile resin, polycarbonate resin, polyphenyleneoxide resin, polyketone resin, polysulphone resin, polyphenylenesulfide resin, fluoride resin, silicone resin, polyimide resin, polybenzimidazole resin, polyamide elastomer, etc. can be mentioned. As an example for thermo-setting resins, phenol resin, urea resin, melamine resin, xylene resin, diallylphthalate resin, epoxy resin, aniline resin, furan resin, polyurethane resin, etc. can be mentioned.

The mixing ratio of the ultra-fine carbon fibrils in the resin compound covered by the present invention should be within the range of 0.2–50 wt parts against 100 wt parts of the compound. In order to impart electrical conductivity, it is desirable to add more than 2 wt parts, but no more than 40 wt parts. When the ratio exceeds 50 wt parts the ultra-fine carbon fibrils do not disperse well since they do not mix well with the resin, significantly deteriorating the properties specific to the resin itself, and the appearance of the molded resin compound. When the purpose is merely to attain blackness of the compound covered by the present invention, it is preferable to add 0.1–5 wt parts against 100 wt parts of the compound.

As a method for producing the compound covered by the present invention, any known method can be used. For example, pellets or powder of the resin and a desired amount of the ultra-fine carbon fibrils are dry-blended or wet-blended at first, then mixed in a roll kneader while heated, or fed in an extrusion machine in order to extrude as a rope and then cut into pellets. Alternatively, the ultra-fine carbon fibrils can be blended in a liquid medium with a solution or dispersion of the resin. It is also possible to mix it by the Wet Master Batch method. When a thermosetting resin is used, the ultra-fine carbon fibrils may be mixed as a monomer using any known method suitable for each resin. Further, as a method for molding into a desired shape, any known method such as extrusion molding, blow molding, or press molding can be used.

The compound covered by the present invention may be made into a foamed product by adding a foaming agent in order to obtain a foamed resin with electrical conductivity and/or blackness. Although the aforementioned various resins and elastomers can be used for making such foamed product, thermo-plastic resins such as polyethylene, polypropylene, polyvinylchloride, polystyrene, polybutadiene, polyurethane, ethylene-vinylacetate copolymer, etc. and thermo-plastic elastomers are preferable. As a foaming agent, various resin foaming agents, organic solvents, as well as gases such as butane can be used.

Any known method can be used as a method for producing the electro-conductive foamed body covered by the present invention. For example, when a thermo-plastic resin is used, the resin and a desired amount of the ultra-fine carbon fibrils are melted and mixed by an extrusion machine at first, and a gas such as butane is injected before foaming at the outlet nozzle of the extrusion machine. In this case, the ultra-fine carbon fibrils and the resin may be premixed in an extrusion machine in order to make a master batch, and then foamed by a separate operation. Further, a chemical foaming agent may be used instead of a gas. When producing urethane foam by the present invention, the ultra-fine carbon fibrils may be added in the process of mixing the main agents or hardening and foaming agents. However, it is more effective if the ultra-fine carbon fibrils are dispersed in the main agent or hardening and foaming agents using a blender.

The compound covered by the present invention is also useful as a paint in order to give electrical conductivity and/or blackness to the surface of other substrates. As an example for such a substrate, various resins, elastomers, rubber, wood, inorganic materials, etc. can be mentioned. It is also applicable to molded products of these materials, various foamed resins, foamed thermoplastic elastomers, or foamed rubber.

For example, an electro-conductive foamed body can be produced by forming an electro-conductive layer on a foamed body, by at first soaking a nonconductive foamed body such as polyurethane foam in a paint or paste composed of solvent, resin, and carbon fibrils so that a sufficient amount of paint or paste is absorbed by the foamed body, and then removing the excess paint or paste by squeezing out with rolls, and finally evaporating the solvent.

The desirable thickness of the coated film of such compounds covered by the present invention is greater than 0.1 mm.

In addition, any known additives including fillers such as other kinds of carbon fibrils, carbon black, silica, diatomaceous earth, crushed quartz, talc, clay, mica, calcium silicate, magnesium silicate, glass powder, calcium carbonate, barium sulfate, zinc carbonate, titanium oxide, alumina, glass fibers, other carbon fibers, and organic fibers, softening agents, plasticizers, molding aids, lubricants, anti-aging agents, and UV absorbing agents may be added, as needed, to the compound covered by the present invention.

DESCRIPTION OF THE PREFERRED EMBODIMENTS

The present invention will be explained in further detail by using Application Examples. However, the present invention is not restricted by these Application Examples.

Incidentally, the diameter of the carbon fibril agglomerate is measured by the following procedures.

A sample was adhered on a double-sided tape, and its surface was gold plated. A total of 12 different parts of the gold plated surface were then observed using Hitachi S-510 type SEM at a magnification of x50. The maximum diameter of each agglomerate and the area they occupy were determined from the three average-looking observation spots selected. The content of the agglomerates, having diameters within 0.1–0.25 mm was obtained using the following equation, and results of the three observations were averaged.

$$\text{Content} = \frac{\text{Area occupied by agglomerate with } 0.1-0.25 \text{ mm diameter}}{\text{Area occupied by all agglomerates}} \times 100$$

Other properties were measured by the following methods.

Izod Impact Strength: (ASTM D256 ¼ NOTCH AT 23° C.)

Melt-flow Index: (based on ASTM D1238 AT 220° C., 10 kg weight.) *(However, 230° C., 10 kg were used for Nylon 6)

Intrinsic Volumetric Resistivity: (DIN-53596)

Surface Appearance of Molded Products:

Test pieces with length 80 mm, width 55 mm, and thickness 2 mm were molded.

Appearance of the test pieces was observed, and evaluated by the following three categories.

O . . . Superior surface gloss. Smooth surface, and no exposed carbon materials. No particular appearance problems.

^. . . Low surface gloss, or at least one type of defect spot such as grain mark or flow mark. However, degree of defect is minimal.

X . . . Low surface gloss or defective spots such as grain mark or flow mark. Multiple number of defective spots or a severe defect exists. Even where only one spot is involved, it significantly mars the surface smoothness.

Color (L value):

Multi light source spectrometer (Suga Testing Machinery KK, Model MSC-1S)

Application Examples 1–6 and Reference Examples 1–8

ABS resin (Nippon Synthetic Rubber KK, JSRABS35) and Nylon 6 (Toray CM-1017) were used as the resin. The ultra-fine carbon fibrils had diameter 10 nm, length 10 microns, inter-layer distance measured by the wide angle X-Ray diffractometry 3.45 A, and diffraction angle 25.8 degrees.

Types, diameters, and contents of the ultra-fine carbon fibril were as follows:

| Ultra-fine carbon Fibril (A) | | |
| --- | --- | --- |
| Agglomerate diameter | 0.11–0.25 mm | 75 wt % |
| Ultra-fine carbon Fibril (B) | | |
| Agglomerate diameter | 0.11–0.25 mm | 25 wt % |
| Agglomerate diameter | 0.26–0.50 mm | 10 wt % |

In application Examples 1–6, ultra-fine carbon fibril (A) was used. The ultra-fine carbon fibril (A) was dry-blended with the resin based on the recipe shown in Table 1. The mixture was fed to an extrusion machine and pelletized at 210°–230° C. This pelletized material was blow molded at a similar temperature. A sample piece with length 80 mm, width 55 mm, and thickness 2 mm was prepared for measuring the intrinsic volumetric resistivity and surface appearance, while a sample piece with length 63.5 mm, width 12.7 mm, and thickness 6.35 mm was prepared for measuring the impact strength.

In Reference Example 1, 55 wt parts of ultra-fine carbon fibril (A) was blended. In Reference Examples 2–4, ultra-fine carbon fibril (B) was used in place of ultra-fine carbon fibril (A). In Reference Examples 5–6, electro-conductive carbon black (Lion Aczo KK, Kechen Black EC-DJ 5000) was used in place of ultra-fine carbon fibril (A), while reinforcing type carbon fiber (Asahi Carbon Fiber Co., A-6000) was used in Reference Examples 7–8. In these Impact strength, intrinsic volumetric resistance, and appearance of molded surface were measured for the obtained sample pieces. Fluidity was measured using the pellets. Results are shown in Table 1.

TABLE 1

|  |  | Appl. Ex. 1 | Appl. Ex. 2 | Appl. Ex. 3 | Appl. Ex. 4 | Appl. Ex. 5 | Appl. Ex. 6 | Appl. Ex. 7 | Ref. Ex. 1 | Ref. Ex. 2 |
|---|---|---|---|---|---|---|---|---|---|---|
| (Blending Recipe) {wt parts} | | | | | | | | | | |
| ABS Resin | | 97 | 95 | 90 | 60 | | | 99 | 45 | 95 |
| Nylon 6 Resin | | | | | | 95 | 90 | | | |
| Ultra-fine Carbon Fibril | (A) | 3 | 5 | 10 | 40 | 5 | 10 | 1 | 55 | |
| " | (B) | | | | | | | | | 5 |
| Kechen Black EC | | | | | | | | | | |
| Carbon Fiber (A-6000) | | | | | | | | | | |
| (Evaluation Results) | | | | | | | | | | |
| Melt Flow Rate (g/10 min) (220° C., 10 kg) | | 35 | 27 | 10 | no flow | 43*1 | 9*1 | 40 | no flow | 5 |
| Izot Impact Strength (Kg · cm/cm), (¼" notch) | | 10 | 7 | 4 | 1 | 10 | 7 | 10 | 1 | 3 |
| Intrinsic Volumetric Resistivity (Ω · cm) | Min. | $6 \times 10^6$ | $2 \times 10^4$ | 5 | 0.1 | $2 \times 10^6$ | $3 \times 10^5$ | $>1 \times 10^7$ | 0.04 | $9 \times 10^5$ |
| | Max. | $8 \times 10^6$ | $4 \times 10^4$ | 10 | 0.2 | $4 \times 10^6$ | $5 \times 10^5$ | $>1 \times 10^7$ | 0.08 | $5 \times 10^6$ |
| Appearance of Molded Product | | ○ | ○ | ○ | ▲ | ○ | ○ | | X | ▲ |

|  |  | Ref. Ex. 3 | Ref. Ex. 4 | Ref. Ex. 5 | Ref. Ex. 6 | Ref. Ex. 7 | Ref. Ex. 8 |
|---|---|---|---|---|---|---|---|
| (Blending Recipe) {wt parts} | | | | | | | |
| ABS Resin | | 90 | 60 | 95 | 90 | 95 | 90 |
| Nylon 6 Resin | | | | | | | |
| Ultra-fine Carbon Fibril | (A) | | | | | | |
| " | (B) | 10 | 40 | | | | |
| Kechen Black EC | | | | 5 | 10 | | |
| Carbon Fiber (A-6000) | | | | | | 5 | 10 |
| (Evaluation Results) | | | | | | | |
| Melt Flow Rate (g/10 min) (220° C., 10 kg) | | no flow | no flow | 25 | 6 | 32 | 25 |
| Izot Impact Strength (Kg · cm/cm), (¼" notch) | | 1 | 1 | 2 | 1 | 6 | 6 |
| Intrinsic Volumetric Resistivity (Ω · cm) | Min. | 20 | 0.9 | $>1 \times 10^7$ | 180 | $>1 \times 10^7$ | $2 \times 10^3$ |
| | Max. | 50 | 8 | $>1 \times 10^7$ | 900 | $>1 \times 10^7$ | $9 \times 10^3$ |
| Appearance of Molded Product | | X | X | ○ | ▲ | X | X |

*1 Measurements were carried out at 230° C., and 10 kg weight in the case of Nylon 6.

As shown in Application Examples 1–6, the compounds which contain the ultra-fine carbon fibril (A) covered by the present invention have superior electro-conductivity imparting effect to other carbon type materials when comparing Application Examples 2, 3 to Reference Examples 2–8.

The appearance of the molded products of the obtained compounds is also good. The mechanical strengths and molding ability are also unlikely to decline.

In Reference Example 1, a larger amount of ultra-fine carbon fibril was added. Although a high electrical conductivity was obtained in this case, molding ability was conductivity was obtained in this case, molding ability was poor, making molding difficult. A molded product, when produced, had an extremely poor surface appearance.

In Reference Examples 2–4, the ultra-fine carbon fibril (B) was used in place of the ultra-fine carbon fibril (A). In these cases, dispersion of carbon fibril in the resin was poor, and appearance of the molded product was drastically inferior, in addition to the relatively low electrical conductivity. Molding was also difficult because of the reduced molding ability.

In Reference Examples 5 and 6, carbon black was used in place of the ultra-fine carbon fibril (A). In these cases, electrical conductivity varied a great deal, reducing mechanical strength. Further, the molding ability was significantly reduced when the amount of filler was increased.

In Reference Examples 7 and 8, a reinforcing type carbon fiber was used in place of the ultra-fine carbon fibril (A). The reinforcing type carbon fiber did not impart sufficient electrical conductivity. The surface smoothness was also marred because the fiber was exposed at the surface of the molded product.

Application Examples 8, 9

Pellets and test pieces were produced by following the procedures used in Application Examples 1–6 with the exception of changing the amounts of ultra-fine carbon fibril (A) as shown in Table 2.

Impact strength, color, and appearance of the molded products of the obtained test pieces, and fluidity of the pellets were measured. Results are shown in Table 2.

Reference Examples 9, 10

Pellets and test pieces were produced by following the procedures used in Application Examples 7 and 8 with the Kasei KK, Mitsubishi Color carbon Black #45) in place of the ultra-fine carbon fibril (A).

Impact strength, color, and appearance of the molded products of the obtained test pieces, and fluidity of the pellets were measured. Results are shown in Table 2.

TABLE 2

|  | Appl. Ex. 8 | Appl. Ex. 9 | Ref. Ex. 9 | Ref. Ex. 10 |
|---|---|---|---|---|
| (Blending Recipe) | | | | |
| ABS Resin {wt parts} | 99.7 | 99.5 | 99.7 | 99.5 |
| Ultra-fine Carbon Fibril (A) | 0.3 | 0.5 | | |
| Pigment Carbon Black*1 | | | 0.3 | 0.5 |
| Dispersion Agent*2 | 0.15 | 0.25 | 0.15 | 0.25 |
| (Evaluation Results) | | | | |
| Melt Flow Rate (g/10 min) (220° C., 10 kg) | 45 | 42 | 45 | 42 |
| Izot Impact Strength (Kg · cm/cm), (¼" notch) | 15 | 14 | 15 | 13 |
| Color (L value) | 8.99 | 7.22 | 9.52 | 8.99 |
| Appearance of Molded Products | O | O | O | O |

*1 Coloring Carbon Black #45 made by Mitsubishi Carbon Black KK was used as the pigment grade carbon black.
*2 Magnesium-stearate was used as the dispersion agent.

In application Examples 8 and 9, the ultra-fine carbon fibril was used as a coloring agent. Comparing with Reference Examples 9 and 10, in which conventional pigment grade carbon black was used, similar color was obtained by a relatively smaller dosage.

Application Examples 10–12, Reference Examples 11–12

100 wt parts of low density polyethylene (density 0.921 g/cm$^3$, melt-flow index (MI) 17 g/10 min) was charged into a pressure kneader, and melted at 150° C. A desired amount of the ultra-fine carbon fibril or Kechen Black, as shown in Table 3, was added, linearly extruded from an extrusion machine, and cut into pellets.

The pellets were charged to a foaming extruder at a rate of 30 kg/hr, and melted at 180° C. Butane gas was injected from the injection nozzle at the rate of 0.3 kg/hr, and the content was cooled while being mixed. Subsequently, the mixture was formed in an annular extrusion ring (60 mm diameter) located at the tip of the extrusion machine. The foam was processed into a sheet by a mandrel.

The obtained polyethylene sheet was cut into pieces 1.0 cm×1.0 cm×3.55 cm long. Lengthwise resistance was measured by a tester, and the surface resistivity (Ds) Ohm was obtained. Results are shown in Table 3.

TABLE 3

|  | Appl. Examples | | | Ref. Examples | |
|---|---|---|---|---|---|
|  | 10 | 11 | 12 | 11 | 12 |
| Polyethylene | 100 | 100 | 100 | 100 | 100 |
| Ultra-Fine Carbon Fibril | 5 | 10 | 15 | — | — |
| Kechen Black | — | — | — | 5 | 1–0 |
| Surface Resistance (Ohm) | 3.0 × 10$^4$ | 7.5 | 1.5 | 1.0 × 10$^7$ | 5.0 × 10$^{10}$ |

Application Examples 13–15, Reference Examples 13, 14

In application Examples 13–15, the ultra-fine carbon fibril (A) was added to polyetherpolyol (OH value 56) with three active radicals, and dispersed by using a ball mill designed for preparing ink products. Subsequently, TDI (toluenediisocyanate) (T-S0), DABCO (1,4-diazabicyclo-2,2,2-octane), and toluene as the solvent was added, and reacted under room temperature for a period of 5 hours in a stirred vessel in order to obtain a urethane solution.

In Reference Examples 13 and 14, a urethane solution was prepared by the same procedures as described above with the exception of using Kechen Black in place of the ultra-fine carbon fibril (A).

Urethane foam with 1.0 cm×1.0 cm×3.55 cm-long dimensions (Sekisui Kagaku, SKY-12) was soaked in the above urethane solutions. After fully soaking the foam in the urethane solution, excess urethane solution was removed by passing through a pair of rollers, and then air-dried overnight. The surface resistance was measured with the dried samples.

Thickness of the coating was measured by observing a cross-section of the foam with an electron microscope. Results are shown in Table 4.

TABLE 4

|  | Appl. Examples | | | Ref. Examples | |
|---|---|---|---|---|---|
|  | 13 | 14 | 15 | 13 | 14 |
| Polyol | 100 | 100 | 100 | 100 | 100 |
| TDI | 51 | 51 | 51 | 51 | 51 |
| DABCO | 0.1 | 0.1 | 0.1 | 0.1 | 0.1 |
| Ultra-Fine Carbon Fibril | 3.8 | 7.6 | 3.8 | 3.8* | 7.6* |
| Toluene | 300 | 300 | 600 | 300 | 300 |
| Surface Resistance (Ohm) | 1.4 × 10$^5$ | 1.2 × 10$^3$ | 1.0 × 10$^9$ | 7.5 × 10$^6$ | 1.5 × 10$^5$ |
| Coat Thickness (microns) | 0.85 | 1.21 | 0.08 | | |

*Kechen Black was used.

The resin compound covered by the present invention has excellent electrical conductivity which is fairly consistent since ultra-fine carbon fibrils with special structure are used. The invention calls for a smaller amount of the ultra-fine carbon fibril than conventional electrically conductive carbon black to obtain the same electrically conductive carbon black to obtain the same electrical conductivity. In addition, molded products have superior surface appearance since the resin is easy to handle and features superior molding ability.

The resin compound covered by the present invention is effective as a material with superior properties which generates no noise due to static electricity for computer housing, structural parts of office automation equipment, etc., or for structural parts of equipment which require shielding or electrically insulating characteristics, or for electrical cable jackets.

Further, the resin compound covered by the present invention has superior blackness compared to the products with conventional pigment grade carbon black since ultra-fine carbon fibrils are used as a coloring agent for the resin. Therefore, a smaller amount of coloring agent is required for obtaining the same blackness, maintaining the desirable properties specific to the resin itself.

Moreover, the compound covered by the present invention can be used for various sliding parts due to its superior lubricating characteristics.

Other embodiments are within the following claims.

We claim:

1. A resin composition comprising:
   a. a carbon fibril material, at least 50 weight percent of which is in the form of agglomerates of intertwined carbon fibrils and
   b. a synthetic resin, the at least 50 weight percent agglomerates having diameters of about 0.10 to about 0.25 millimeter,
   the carbon fibrils having diameters of about 3.5 to about 70 nanometers, lengths at least about 5 times greater than their diameter and
   said carbon fibril material being present in an amount of about 0.1 to about 50 parts by weight per 100 parts by weight of the composition and said synthetic resin being present in an amount of about 99.9 to about 50 parts by weight per 100 parts by weight of the composition.

2. A resin in accordance with claim 1 wherein the inner core of said carbon fibrils is substantially hollow.

3. A resin in accordance with claim 2 wherein the diameter of the inner core of said carbon fibrils is greater than about 2 nanometers.

4. A resin in accordance with claim 2 wherein the synthetic resin comprises acrylonitrile-butadiene-styrene resin, acrylonitrile-ethylene/propylene-styrene resin, methylmethacrylate-butadiene-styrene resin, acrylonitrile-butadiene-methylmethacrylate-styrene resin, acrylonitrile-n-butylacrylate-styrene resin, rubber modified polystyrene, polyethylene resin, polypropylene resin, polystyrene resin, polymethyl-methacrylate resin, polyvinylchloride resin, cellulose-acetate resin, polyamide resin, polyester resin, polyacrylonitrile resin, polycarbonate resin, polyester resin, polyacrylonitrile resin, polycarbonate resin, polyphenyleneoxide resin, polyketone resin, polysulphone resin, polyphenylenesulfide resin, fluoride resin, silicone resin, polybenzimidazole resin, polyamide elastomer, phenol resin, urea resin, melamine resin, xylene resin, diallylphthalate resin, epoxy resin, aniline resin, furan resin, or polyurethane resin.

5. A resin composition in accordance with claim 1, wherein the carbon fibrils have diameters from about 3.5 to about 40 nanometers.

6. A resin composition in accordance with claim 1, wherein the carbon fibrils have lengths from about $10^2$ to about $10^4$ times the diameter.

7. A resin composition in accordance with claim 1, wherein the carbon fibrils impart electrical conductivity to the resin composition.

8. A resin composition in accordance with claim 1, wherein the inner core region of said carbon fibrils contains carbon atoms less ordered than the carbon atoms in the outer region.

9. A resin composition in accordance with claim 1, wherein the composition comprises an electrically conductive composite resin.

10. An electrically conductive resin composition in accordance with claim 9, wherein an inter-layer distance between the continuous layers of the ordered carbon atoms is from about 3.38 to about 3.50 Angstroms.

11. A resin composition in accordance with claim 1, wherein the agglomerates are present in an amount sufficient to provide electrical conductivity.

12. A resin composition in accordance with claim 1, wherein the agglomerates are present in an amount sufficient to enhance mechanical strength in the resin composition.

13. An electrically conductive resin composition in accordance with claim 9, wherein the carbon fibril material is present in an amount greater than 2 and less than 40 parts by weight per 100 parts by weight of the resin composition.

14. A resin composition in accordance with claim 1, wherein the carbon fibril material is present in an amount from about 0.1 to about 5 parts by weight per 100 parts by weight of the resin composition.

15. A resin composition in accordance with claim 1, wherein the composition comprises a resin foam.

16. A resin composition in accordance with claim 15, wherein said carbon fibril is present in an amount sufficient to impart electrical conductivity.

17. A resin composition in accordance with claim 15, wherein said carbon fibril material is present in an amount sufficient to impart blackness.

18. A resin composition in accordance with claim 15, wherein the synthetic resin comprises thermoplastic elastomers and thermoplastic resins.

19. A resin composition in accordance with claim 15, wherein the synthetic resin comprises polyethylene, polypropylene, polyvinylchloride, polystyrene, polybutadiene, polyurethane or ethylene-vinylacetate copolymer.

20. A resin composition in accordance with claim 15, wherein the resin foam comprises resin foaming agents, organic solvents, or gases.

21. A resin composition in accordance with claim 1, wherein the composition comprises a paint.

22. A resin composition in accordance with claim 21, wherein the paint imparts electrical conductivity to a substrate's surface.

23. A paint comprising the resin composition in accordance with claim 1, wherein the paint imparts blackness to a substrate's surface.

24. A resin composition in accordance with claim 1, wherein said carbon fibrils comprise an outer region of essentially continuous layers of ordered carbon atoms and an inner core region.

25. A resin composition in accordance with claim 24, wherein said outer and inner core regions being coaxially aligned along the cylindrical axis of the fibril.

26. A resin composition in accordance with claim 1, wherein the carbon fibril material comprises agglomerates of intertwined carbon fibrils and the maximum diameter of said agglomerates is less than 0.25 mm.

* * * * *